United States Patent [19]

Pakosh

[11] 4,059,171
[45] Nov. 22, 1977

[54] REVERSIBLE SEAT AND STEERING CONSOLE FOR TRACTORS

[76] Inventor: Daniel Pakosh, 261 Knowles Avenue, Winnipeg, Canada

[21] Appl. No.: 643,680

[22] Filed: Dec. 23, 1975

[30] Foreign Application Priority Data

June 17, 1975 Canada .................................. 229569

[51] Int. Cl.² .......................... B60N 1/08; B60N 1/02
[52] U.S. Cl. ................................. 180/77 S; 108/140; 248/416; 296/65 R; 297/349
[58] Field of Search .................... 180/77 S; 296/65 R; 297/349; 248/393, 416, 429; 108/140

[56] References Cited

U.S. PATENT DOCUMENTS

| 1,967,016 | 7/1934 | Weidman | 108/140 |
| 2,833,367 | 5/1958 | Pool et al. | 180/77 S |
| 3,257,013 | 6/1966 | Arnold | 180/77 S X |
| 3,347,558 | 10/1967 | Grimes et al. | 180/77 S |
| 3,568,972 | 3/1971 | Sherman | 248/429 |
| 3,603,609 | 9/1971 | Hott | 248/429 |
| 3,659,895 | 5/1972 | Dresden | 296/65 R |
| 3,690,395 | 9/1972 | Spiller et al. | 180/77 S |
| 3,841,429 | 10/1974 | Falcone | 180/77 S |
| 3,891,003 | 6/1975 | Duttarer | 180/77 S X |
| 3,933,224 | 1/1976 | Nilsson | 180/77 S |

Primary Examiner—Philip Goodman
Assistant Examiner—David M. Mitchell
Attorney, Agent, or Firm—Stanley G. Ade

[57] ABSTRACT

The present device includes a one-piece seat, steering and instrument console pivotally mounted within the cab and capable of being rotated so that the driver faces either forwardly or rearwardly. The seat is adjustable relative to the steering portion of the console and the entire console is adjustable fore and aft within the cab to suit the operator's convenience and choice.

6 Claims, 5 Drawing Figures

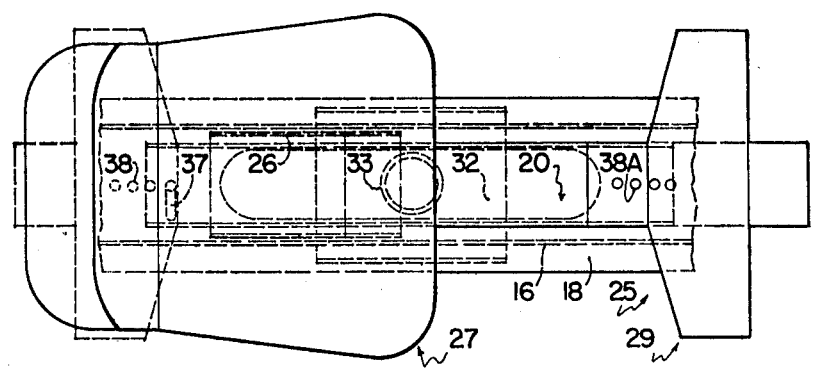
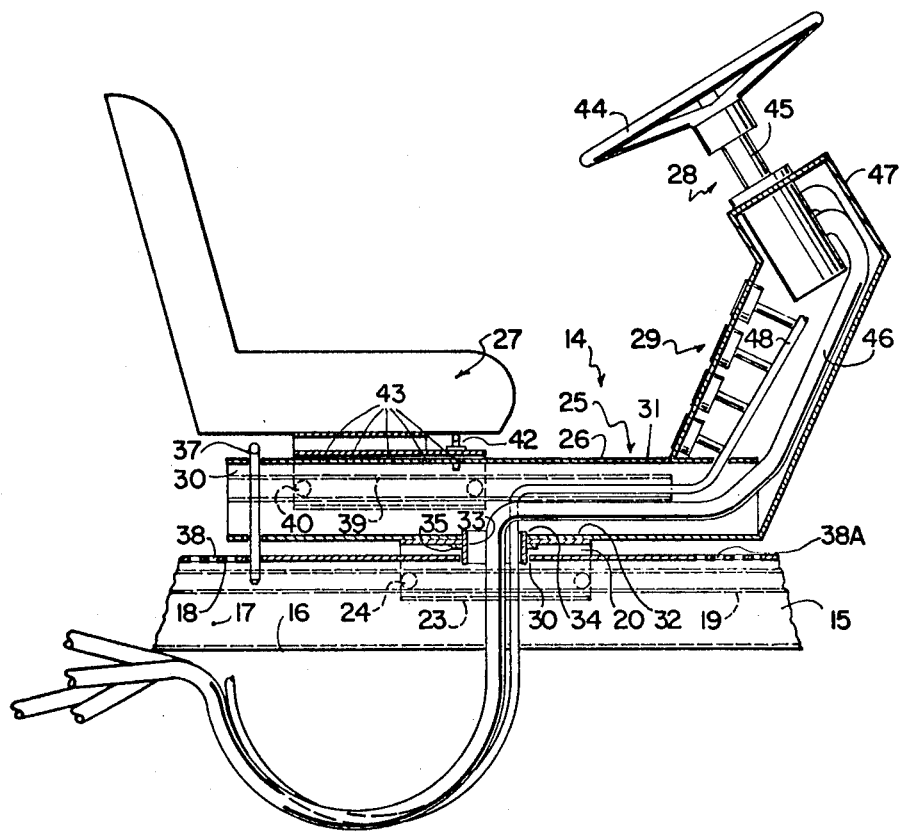
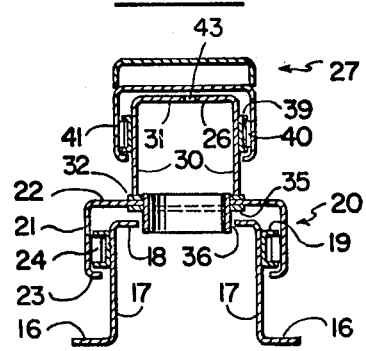

REVERSIBLE SEAT AND STEERING CONSOLE FOR TRACTORS

BACKGROUND OF THE INVENTION

This invention relates to new and useful improvements in steering, seating and, if desired, instrument portions of a cab of a tractor.

Conventionally, the seat is fixed with the operator facing forwardly with the steering assembly in front of the operator. When the tractor is being driven forwardly, this arrangement is satisfactory so that implements attached behind the tractor can be pulled in the usual manner.

However, many present day implements are best operated if they are pushed by the tractor and although a similar three-point hitch could be situated upon the front of the tractor, nevertheless the tractor balance would be upset and the expense would be considerable.

When it is desired to attach such implements to a tractor, for example, a swather, the operator has to turn around in the seat and drive the tractor rearwardly in order to operate the implements satisfactorily. It is therefore apparent that such operating conditions are inconvenient and extremely tiring particularly when considerable work is being done with push-type implements.

SUMMARY OF THE INVENTION

The present invention overcomes the disadvantages by providing a seat and steering console in one piece which can be rotated through 180° so that the operator can either face rearwardly or forwardly of the tractor, depending upon driving conditions.

The principal object and essence of the invention is therefore to provide a one-piece console which includes at least the steering assembly and the seat of the operator and which can be rotated within the cab of the tractor so that the operator faces forwardly or rearwardly.

Another object of the invention is to provide a device of the character herewithin described which desirably but not necessarily includes the instrument panel assembly below the steering assembly and which rotates with the one-piece console so that the driver can check the engine instruments readily and easily.

Another object of the invention is to provide a device of the character herewithin described in which the seat portion of the console can be adjusted fore and aft relative to the steering assembly portion of the console.

Yet another object of the invention is to provide a device of the character herewithin described in which the entire console can be adjusted within limits, fore and aft of the cab, in order to suit the operator's convenience, and the conditions under which the tractor is being operated.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a fragmentary partially sectioned side elevation of the console mounted upon the cab frame.

FIG. 2 is a top plan view of FIG. 1 with the steering portion deleted for clarity.

FIG. 3 is a partial section substantially along the line 3—3 of FIG. 1.

In the drawings like characters of reference indicate corresponding parts in the different figures.

DETAILED DESCRIPTION

Figure 4:
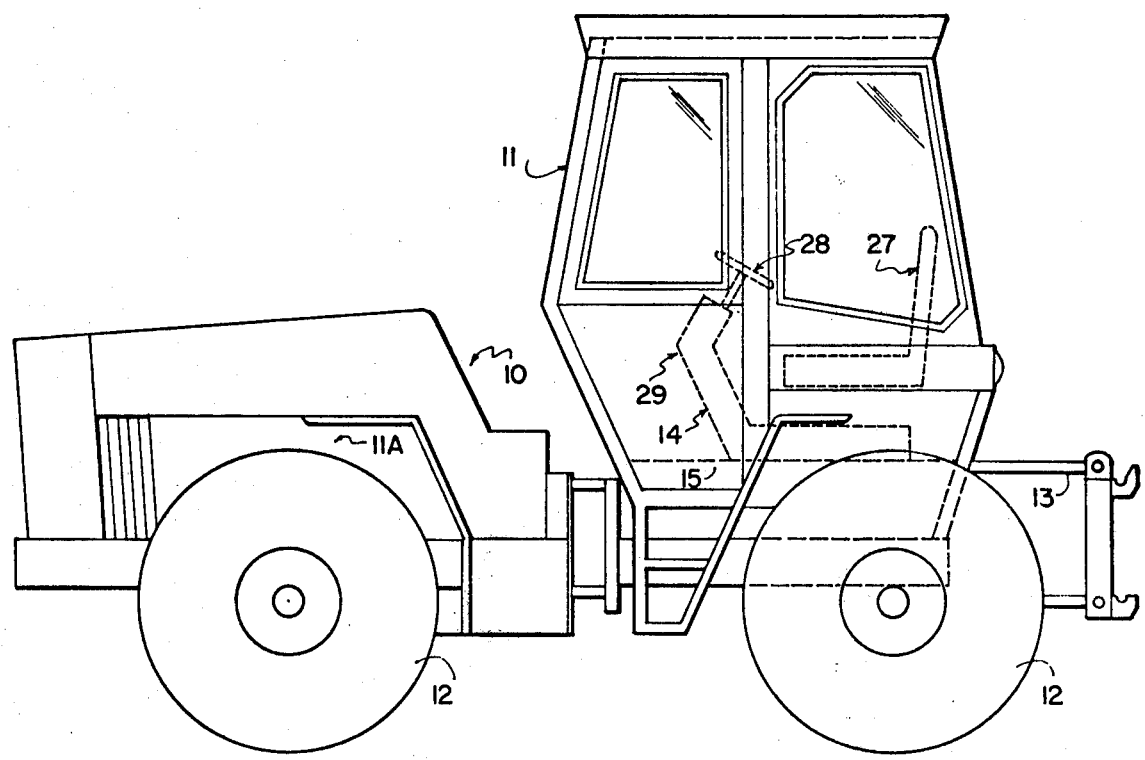
FIG. 4 is a schematic side elevation of a tractor with the invention shown in phantom in the normal or forward facing position.

Proceeding therefore to describe the invention in detail, reference character 10 illustrates schematically the side elevation of a tractor, in this instance, an articulated tractor including a source of power 11A situated in the front portion thereof and having a cab collectively designated 11 mounted upon the rear portion thereof. Ground engaging wheels 12 support the tractor in the usual manner and a conventional three-point hitch assembly 13 is secured to and extends from the rear of the tractor as clearly shown.

Within the cab 11 is situated the invention collectively designated 14 and which is shown in detail in FIGS. 1 to 3 inclusive.

A longitudinally extending frame member 15 is situated within the base of the cab and consists in this embodiment, of a reversed U-shaped cross sectional member having attaching flanges 16 extending upon each side thereof, vertical portions 17 and an upper horizontal web or flange 18.

A pair of channel members 19 are secured upon each of the vertical flanges 17 and externally thereof and support the invention 14 as will hereinafter be described.

A main support member 20 is provided and is also of a reversed U-shaped configuration when viewed in cross section as clearly shown in FIG. 3. It includes vertical members 21, upper horizontal flange 22 and lower inturned legs or portions 23. A plurality of rollers 24 are mounted for rotation on the inside face of the vertical members 21 and these rollers engage the aforementioned channels 19 so that the entire assembly 14 can move fore and aft relative to the frame member 15. In this connection, means are provided to lock the assembly 14 in any one of a plurality of positions fore and aft, relative to the member 15 and this particular feature will hereinafter be described.

A one-piece console collectively designated 25 includes a seat frame member 26, a seat assembly 27, and a steering assembly collectively designated 28.

An instrument panel assembly collectively designated 29 is preferably incorporated within the console 25, but can be located separately within the cab if desired.

The seat frame member 26 is a substantially box-shaped cross sectioned channel or member including spaced and parallel side flanges 30, upper horizontal flange 31 and lower horizontal flange 32.

A relatively short mounting tube 33 is secured as by welding 34 within an aperture formed in the lower flange 32 of the seat support member 26 and this support tube extends downwardly through an aperture within the member 20. A washer 35 is then engaged around the tubular support member 33 and is welded in position on the lower side of the horizontal flange 22 of the member 20 as clearly illustrated in FIGS. 1 and 2, thus mounting the seat support member 26 for rotation in a horizontal plane relative to the member 20. The lower end of the support tube 33 freely engages within an aperture 36 formed within the upper flange 18 of the frame member 15.

A detachable locking pin 37 engages through an aperture within the seat support member 26 and within any one of a plurality of apertures 38 formed within the one end of the frame member 15 as clearly shown in FIG. 1 thus locking the seat support member 26 and the associated console in the position illustrated in FIG. 1.

Similar apertures 38A are provided on the opposite end of the frame member 15 for locating the console 25 in the reverse position as will hereinafter be described.

Horizontally extending panels 39 are secured on the outer sides of the vertical portion 30 of the seat support member 26 and are engaged by rollers 40 which are journalled for rotation within vertical portions 41 of the seat assembly 27 so that this seat assembly can be moved fore and aft relative to the seat support member 26 and locked in the desired position by means of a lock pin 42 engageable within any one of a plurality of apertures 43 formed in the upper flange 31 of the seat support member 26.

The steering assembly 28 includes a steering wheel 44 and a steering column 45 operatively connected by means of tubing 46, to hydraulic steering mechanism on the tractor (not illustrated).

The tubing 46 passes downwardly through the tubular support 33 and is flexible so that rotation of the assembly through 180° as will hereinafter be described, can be initiated.

Support structure 47 is provided for the steering assembly 28 and also forms the instrument console 29. The various instruments are connected to the source of power by means of tubular or electrical connections shown schematically by reference character 48 which also extend freely through the tubular support 33 to permit the aforementioned 180° rotation of the console relative to the frame 15.

In operation, and referring first to FIG. 4, the console 25 is situated relative to frame 15 reverse from that shown in FIG. 1, so that the operator, being seated within the seat assembly 27, faces forwardly and the tractor is operated in the conventional manner.

Under these circumstances, lock pin 37 would be engaged in any one of the plurality of apertures 38A within the frame member 15 so that the entire console 25 is locked in position. It may however be positioned fore and aft by selection of the relevant aperture 38A. Furthermore, the seat assembly 27 may be positioned relative to the steering assembly 28 by the engagement of pin 42 within one of the apertures 43 depending upon the operator's choice.

Figure 5:
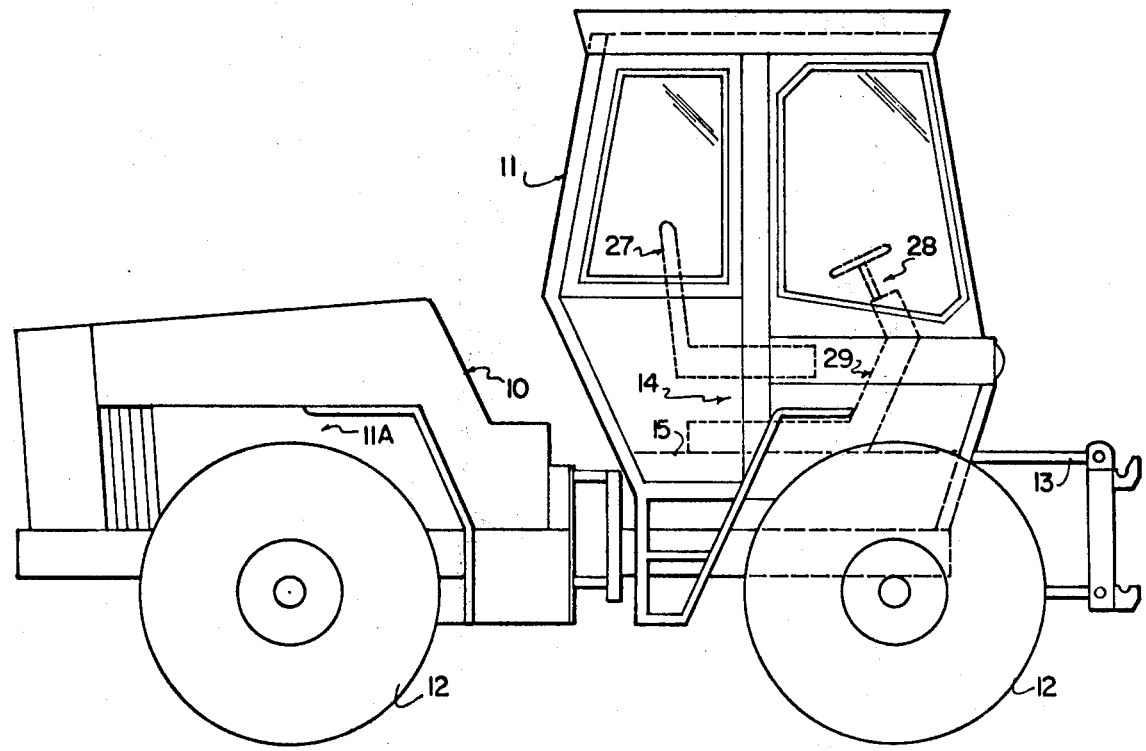
FIG. 5 is a view similar to FIG. 4, but showing the invention in the reversed or rearwardly facing position.

If, however, it is decided to attach a push-type implement to the rear of the tractor and operate the tractor in the opposite direction or rearwardly, then pin 37 is withdrawn and the entire assembly rotated through 180° in an horizontal plane so that it takes up the position illustrated in FIGS. 1 and 5 whereupon pin 37 is engaged through any one of apertures 38 with the fore and aft relationship of the console being adjusted in a manner hereinbefore described.

This enables the operator to face rearwardly and to steer the tractor in the normal manner and, if the instrument assembly 29 is mounted as illustrated, to maintain a constant check upon the engine conditions.

Once again the relationship of the seat assembly 27 may be adjusted relative to the steering assembly, at the choice of the operator.

Of importance is the fact that the rotation of the console should always be in the reversed direction to the last rotation in order to prevent the tubes 46 and 48 from twisting to a degree which may exceed the designed parameters thereof.

This is easily accomplished by any one of a variety of stop means (not illustrated) which will prevent the console from rotating through a full 360°.

From the foregoing it will be appreciated that a simple one-piece console has been provided incorporating the seat assembly 27 and the steering assembly 28 and, if desired, the instrument assembly 29. The mounting of this console within the cab is such that it may be rotated through 180° so that the operator may face forwardly or rearwardly, the seat assembly may be adjusted relative to the steering assembly and the entire console may be adjusted within the cab depending upon the operating conditions.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a tractor which includes a frame a source of power in the frame and a cab on the frame behind the source of power and a hitch connection at the rear of the frame; a one-piece seat and steering console, means to mount said console on said frame for rotation from a forwardly facing position to a rearwardly facing position and vice versa, means to detachably lock said console in either of the aforesaid positions, means to move said console forwardly and rearwardly on said frame and to detachably lock said console in any one of a plurality of positions, said means to detachably lock said console in the forwardly or rearwardly facing position also detachably locking said console in any one of said plurality of positions forwardly and rearwardly of said frame and means to adjust the fore and aft position of the seat portion of said console relative to the steering portion of said console.

2. The invention according to claim 1 in which console includes a longitudinally extending seat frame, said seat being mounted upon said seat frame, said means to mount said console for rotation including a cylindrical support secured to and depending from said seat frame substantially centrally of said console, cylindrical support receiving means in the associated tractor frame within which said cylindrical support is journalled for rotation whereby said console rotates in a horizontal plane.

3. A console for tractors which includes a frame and a source of power and a cab on said frame; means to mount said console for horizontal rotation upon said frame whereby said console may be selectively positioned in a forwardly facing position and in a rearwardly facing position, said console including an operator's seat and a steering assembly, means to detachably lock said console in either one of said positions, means to move said console forwardly and rearwardly on said frame and to detachably lock said console in any one of a plurality of positions, said means to detachably lock said console in the forwardly or rearwardly facing position also detachably locking said console in any one of said plurality of positions forwardly and rearwardly of said frame and means to adjust the fore and aft position of the seat portion of said console relative to the steering portion of said console.

4. The invention according to claim 3 in which console includes a longitudinally extending seat frame, said seat being mounted upon said seat frame, said means to mount said console for rotation including a cylindrical support secured to and depending from said seat frame substantially centrally of said console, cylindrical support receiving means in the associated tractor frame within which said cylindrical support is journalled for rotation whereby said console rotates in a horizontal plane.

5. In a tractor which includes a frame, a source of power in the frame and a cab on the frame behind the source of power and a hitch connection at the rear of the frame; a one-piece seat and steering console, means to mount said console on said frame for rotation from a forwardly facing position to a rearwardly facing position and vice versa, means to detachably lock said console in either of the aforesaid positions, means to move said console forwardly and rearwardly on said frame and to detachably lock said console in any one of a plurality of positions, said means to detachably lock said console in the forwardly or rearwardly facing position also detachably locking said console in any one of said plurality of positions forwardly and rearwardly of said frame and said console including a longitudinally extending seat frame, said seat being mounted upon said seat frame, said means to mount said console for rotation including a cylindrical support secured to and depending from said seat frame substantially centrally of said console, cylindrical support receiving means in the associated tractor frame within said cylindrical suppport is journalled for rotation whereby said console rotates in a horizontal plane.

6. The invention according to claim 5 which includes means to adjust the fore and aft position of the seat portion of said console relative to the steering portion of said console.

* * * * *